Aug. 17, 1965   O. ROGG   3,200,711
WORK HOLDING, CLAMPING AND CENTERING DEVICES
FOR MACHINE TOOLS
Filed Jan. 12, 1962   6 Sheets-Sheet 1
Fig.1
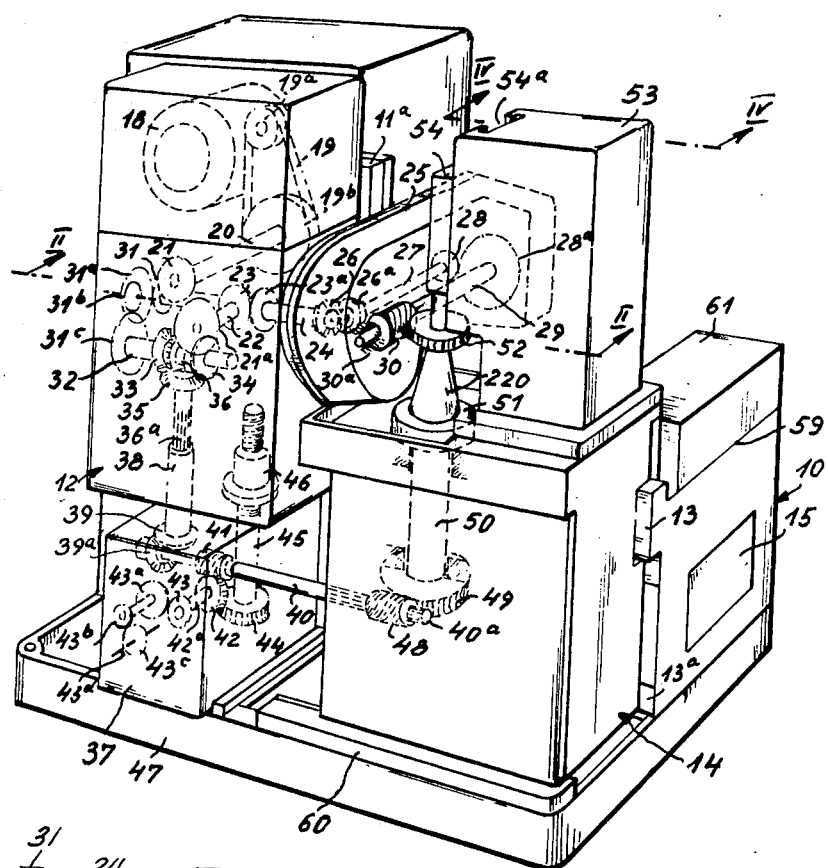
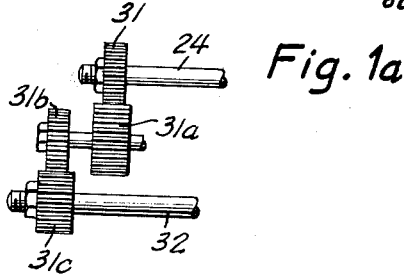
Fig.1a
INVENTOR
Otto Rogg
BY
Michael S. Striker
his ATTORNEY Aug. 17, 1965    O. ROGG    3,200,711
WORK HOLDING, CLAMPING AND CENTERING DEVICES
FOR MACHINE TOOLS
Filed Jan. 12, 1962    6 Sheets-Sheet 3

INVENTOR
Otto Rogg

BY
Michael S. Striker
his ATTORNEY

Aug. 17, 1965  O. ROGG  3,200,711
WORK HOLDING, CLAMPING AND CENTERING DEVICES
FOR MACHINE TOOLS
Filed Jan. 12, 1962  6 Sheets-Sheet 4

INVENTOR
Otto Rogg

BY

Michael S. Striker his ATTORNEY

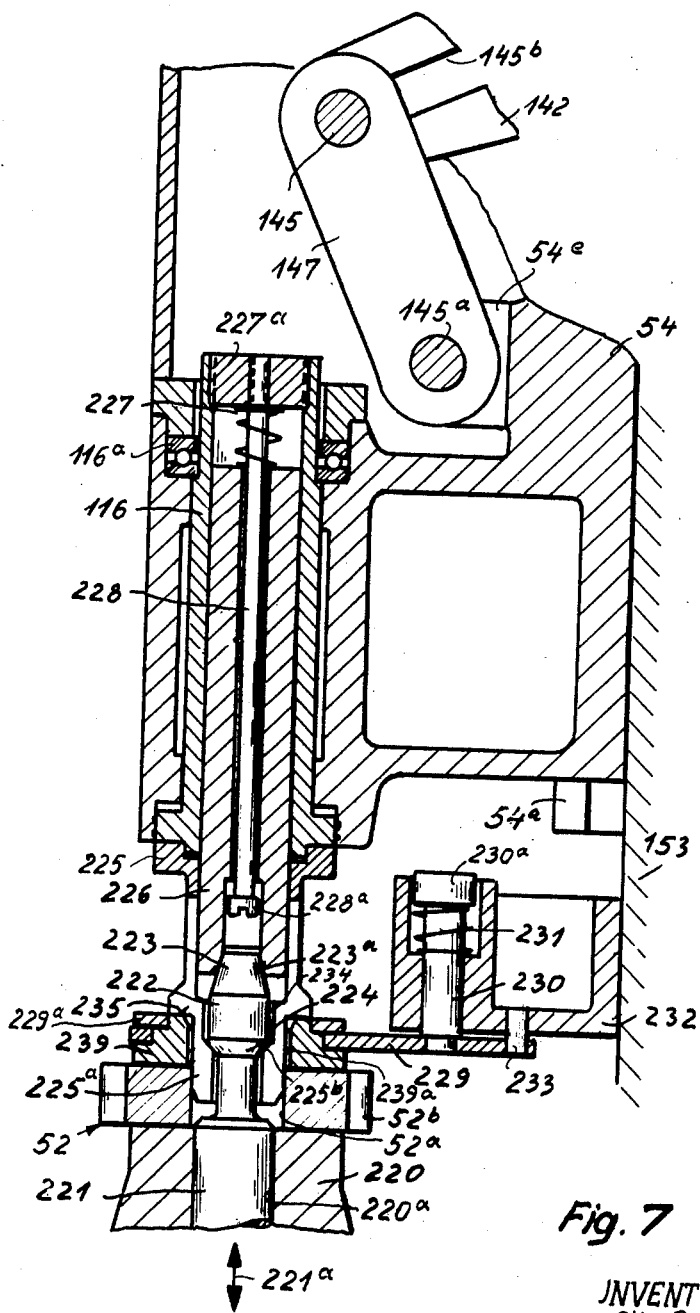

INVENTOR
Otto Rogg

BY

Michael S. Striker
his ATTORNEY

United States Patent Office

3,200,711
Patented Aug. 17, 1965

3,200,711
WORK HOLDING, CLAMPING AND CENTERING
DEVICES FOR MACHINE TOOLS
Otto Rogg, Munich, Germany, assignor to
Carl Hurth, Munich, Germany
Filed Jan. 12, 1962, Ser. No. 165,844
Claims priority, application Germany, Jan. 13, 1961,
H 41,454; Jan. 27, 1961, H 41,560
8 Claims. (Cl. 90—1)

The present invention relates to machine tools in general, and more particularly to improvements in work holding, retaining, clamping and centering devices for use in machine tools. Still more particularly, the invention relates to work retaining, clamping and centering devices which are especially suited for use in gear shaping apparatus, such as machines for shaving the teeth of spur gears, helical gears and the like.

As is known, the output of a machine tool is increased if the duration of contact between a workpiece and the shaping tool is reduced, i.e. if a tool may remove thick shavings during each pass with respect to the workpiece. Such operation renders it necessary to mount the tool and the workpiece with utmost precision and to properly support and retain the workpiece so that the latter remains strongly clamped and is accurately centered during repeated contact with the tool. It is also known that the work retaining headstock and/or the tailstock of a gear shaping machine must be mounted in its ways in such a way that it has at least some, even very slight, play during movement toward or away from the workpiece. This play is very undesirable when the machine tool is utilized for precision treatment of workpieces, e.g. for shaving the teeth of gears and the like, because even minimal tolerances will cause undesirable deviations in the configuration and/or spacing of the gear teeth.

Accordingly, it is an important object of the present invention to provide an improved arrangement which will automatically clamp the work retaining tailstock or headstock of a machine tool to its support or column when the work retaining element is called upon to retain a workpiece, and which will automatically release the element when it becomes necessary to remove the workpiece from or to reset the workpiece in the machine tool.

Another object of the invention is to provide a clamping arrangement of the just outlined characteristics which will automatically increase the clamping pressure upon the work retaining element in response to advance of the element toward the workpiece.

A further object of the invention is to provide a clamping arrangement of the above described type whose clamping force may be determined and changed before the element is set in motion with respect to its support.

An additional object of the invention is to provide a machine tool in which the work retaining element may be reciprocated and clamped by a single mechanically, hydraulically, pneumatically, magnetically or electrically actuated mechanism.

A concomitant object of the invention is to provide an improved work centering device which is especially suited for use in connection with a work retaining tailstock or headstock cooperating with a clamping arrangement of the above outlined characteristics, and which is intended for retention and centering of apertured workpieces, such as spur gears and the like having through bores or apertures into and through which the component parts of the improved device may extend when the device is in actual use.

Still another object of the invention is to provide a work centering device of the just outlined characteristics which is especially suited for use in gear shaving machines and which may be actuated to center or to release a workpiece in a fully automatic way and in rhythm with other operations of the machine tool.

A further object of the invention is to provide a machine tool, particularly a gear shaping machine, which embodies a clamping arrangement and a cooperating centering device of the above outlined characteristics.

With the above objects in view, the invention resides in the provision of a machine tool, particularly of a machine tool for treatment of apertured workpieces, such as spur gears and helical gears, which comprises a frame, a support provided on the frame and having elongated ways, a retaining element (e.g. a headstock) reciprocably mounted in the ways of the support, a spindle supported by the frame and having an axis parallel with the longitudinal direction of the ways, a spindle sleeve supported by the retaining element and coaxial with the spindle, and a combined reciprocating and clamping arrangement for the retaining element. This arrangement comprises a motive-force-transmitting member (e.g. a link, a threaded spindle, a piston rod, or the like) which is operatively connected with the retaining element and is movable in directions enclosing an acute angle with the longitudinal direction of the ways on the support so that the force transmitted by this member to the retaining element includes a reciprocating component which is parallel with the longitudinal direction of the ways and a second component which is perpendicular to the longitudinal direction of the ways. This second component clamps the retaining element to its support when the retaining element is moved in a first direction, and this second component automatically unclamps the retaining element from its support when the element is moved in the opposite direction.

Another important feature of my invention resides in the provision of a work centering and holding device which is mounted in part in the retaining element and is in part supported by the frame. This device comprises a reciprocable center which is axially movable in the spindle or in the spindle sleeve, and a collet which is secured to the spindle sleeve or to the spindle so as to engage with and to be separable from the center. The collet comprises substantially radially movable center-engaging claws and defines an internal space for the center. This center may spread the claws of the collet into centering engagement with the wall bounding the aperture of the workpiece or with a guide sleeve which is mounted in a special work support carried by the spindle. In the latter instance, the center is rigid with a mandrel which has a portion tightly receivable in the aperture of the workpiece.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 1 is a perspective view of a gear shaping machine which comprises a work retaining element and a work centering device embodying one form of my invention;

FIG. 1a is a side elevational view of a detail of the machine shown in FIG. 1;

FIG. 7 is an enlarged fragmentary vertical section through a portion of the retaining element shown in FIG. 5, illustrating one form of my novel work holding and clamping device;

Figure 2:
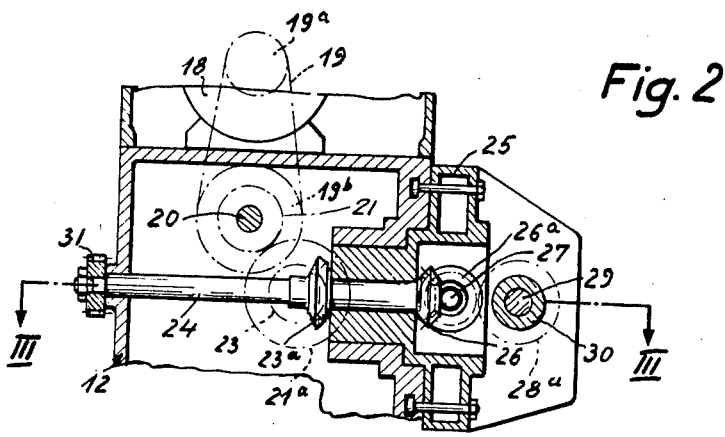
FIG. 2 is an enlarged fragmentary vertical section as seen in the direction of arrows from the line II—II of FIG. 1 or FIG. 3, showing the manner in which the main shaft of the machine transmits rotary motion to the tool spindle.
Figure 3:
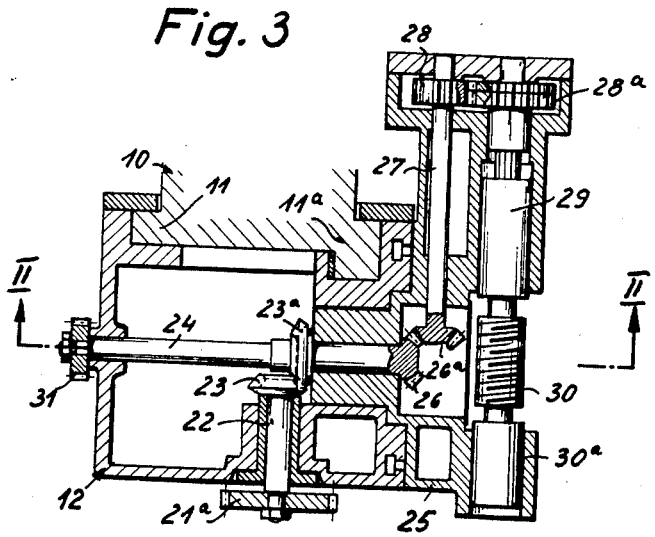
FIG. 3 is a horizontal section as seen in the direction of arrows from the III—III of FIG. 2.

Referring now in greater detail to the illustrated embodiments, and first to FIGS. 1 to 3, there is shown a gear shaping machine which comprises a frame 10 having a pair of spaced vertical guides 11, 11a (see FIG. 3) for a reciprocable hollow tool slide 12, and a pair of spaced horizontal guides 13, 13a for a reciprocable hollow work slide 14. The guides 11, 11a and 13, 13a are provided on the vertical front wall of the frame 10 to control the direction of reciprocatory movement of the slides 12, 14 in such a way that these slides travel in paths which enclose right angles with each other. The frame 10 defines an internal chamber which accommodates a withdrawable shavings-collecting pan or tray 15.

The upper portion of the tool slide 12 receives an electric motor 18 which operates a V-belt drive including a pair of pulleys 19a, 19b and belt means 19. The pulley 19b drives a shaft 20 whose front end portion carries a spur gear 21 forming part of a speed change gear which includes a second spur gear 21a meshing with the gear 21, a shaft 22 which is driven by the gear 21a, and a bevel gear 23 which is driven by the shaft 22. The speed change gear determines the r.p.m. of the tool. The bevel gear 23 drives a bevel gear 23a which is mounted on and rotates a horizontal main shaft 24 (see particularly FIGS. 2 and 3) whose right-hand portion projects from the tool slide 12 and into a turnable tool holder or carrier 25. The latter is mounted on the tool slide 12 and is turnable about the axis of the main shaft 24. This tool holder may be arrested in one or more angular positions of adjustment with respect to the slide 12.

The main shaft 24 carries at its right-hand end a bevel gear 26 which mates with a bevel gear 26a mounted at one end of a shaft 27 which is rotatably mounted in the tool holder 25 and whose other end carries a pinion 28. This pinion meshes with a spur gear 28a which is mounted on a spindle 29 for the substantially worm-shaped tool 30. In the embodiment of FIGS. 1 to 3, the tool 30 is assumed to be a hob. That end portion of the tool 30 which is turned away from the spindle 29 is turnably supported in a suitable backrest 30a (see FIG. 3).

The left-hand end of the main shaft 24 removably carries one spur gear 31 (see FIGS. 1a, 2 and 3) of a gear train or group constituting an index change gear which also includes gears 31a, 31b, 31c, the latter mounted on a horizontal shaft 32 forming part of another group constituting a reversing gear. This reversing gear includes a pair of spaced bevel gears 33, 34 which are freely rotatable on the shaft 32 and which are in permanent mesh with a driven bevel gear 35 mounted at the upper end of a splined shaft 36a, and a clutch sleeve 36 which is driven by and is slidable along the shaft 32. Each axial end of this sleeve is provided with a set of teeth so that the sleeve may alternately engage with complementary teeth of the gear 33 or 34 in order to drive the bevel gear 35 and the splined shaft 36a in clockwise or anticlockwise direction. The control lever which shifts the sleeve 36 along the shaft 32 into engagement with the gear 33 or 34 is not shown in the drawings. The purpose of the reversing gear is to drive the work spindle 50 in clockwise or anticlockwise direction.

The lower end of the splined shaft 36a extends from the underside of the tool slide 12 and into a stationary housing 37 which is fixed to the bedplate 47 of the machine. The housing 37 accommodates an internally splined rotary cylinder 38 which receives the splined lower end portion of the shaft 36a and transmits rotary motion to a bevel gear 39 meshing with a bevel gear 39a mounted at the left-hand end of a worm shaft 40. The splined 36a and the cylinder 38 form part of the driving connection between the main shaft 24 and the work spindle 50. Since the cylinder 38 is rotatable in the stationary housing 37, and since the splined shaft 36a is free to perform axial movements with respect to the cylinder 38, the connection between the reversing gear and the worm shaft 40 is not interrupted when the tool slide 12 is caused to reciprocate in its guides 11, 11a.

The tool slide 12 is reciprocated in the following way: The worm shaft 40 carries a worm 41 which is located in the housing 37 and which meshes with a worm wheel 42 mounted on the input shaft 42a of a feed change gear. This feed change gear further includes a gear train 43, 43a, 43b, 43c, the latter mounted on and driving a worm shaft 43d through a suitable clutch (not shown). The worm on the shaft 43d meshes with a worm wheel 44 mounted at the lower end of a vertical feed spindle or screw 45. The upper portion of the screw 45 projects into the tool slide 12 and meshes with an internally threaded spindle nut 46 which is rigidly mounted in the slide 12 so that rotary movements of the screw 45 in clockwise or anticlockwise direction will compel the slide 12 to move up or down in its guides 11, 11a.

The right-hand portion 40a of the worm shaft 40 is splined and projects into the lower part of the work slide 14 where it meshes with an internally splined worm 48 so that this worm may perform axial movements with respect to but is compelled to share all angular movements of the shaft 40. The worm 48 drives a worm wheel 49 which is provided at the lower end of the work spindle 50. The head or nose 51 of the work spindle 50 is located at a level above the upper side of the work slide 14 and indirectly supports the workpiece 52 in a novel manner which will be described in connection with FIGS. 7 to 9.

The work slide 14 is engaged by a horizontal retaining rail 60 which is fixed to the bedplate 47 so as to prevent any lateral play but to permit horizontal reciprocatory movements of the slide 14 along the guides 13, 13a. The slide 14 carries a support or column 53 which is provided with vertical ways 54a. This slide and support together serve as a supporting arrangement for a work retaining element in the form of a headstock 54 whose novel construction, mounting and operation will be described in connection with FIGS. 4 to 6.

The gears and eventually the motor for effecting feed movements of the work slide 14 along the guides 13, 13a are accommodated in a gear box 61 which is mounted on a supporting surface 59 of the frame 10 rearwardly of the column 53.

Figures 8, 9:
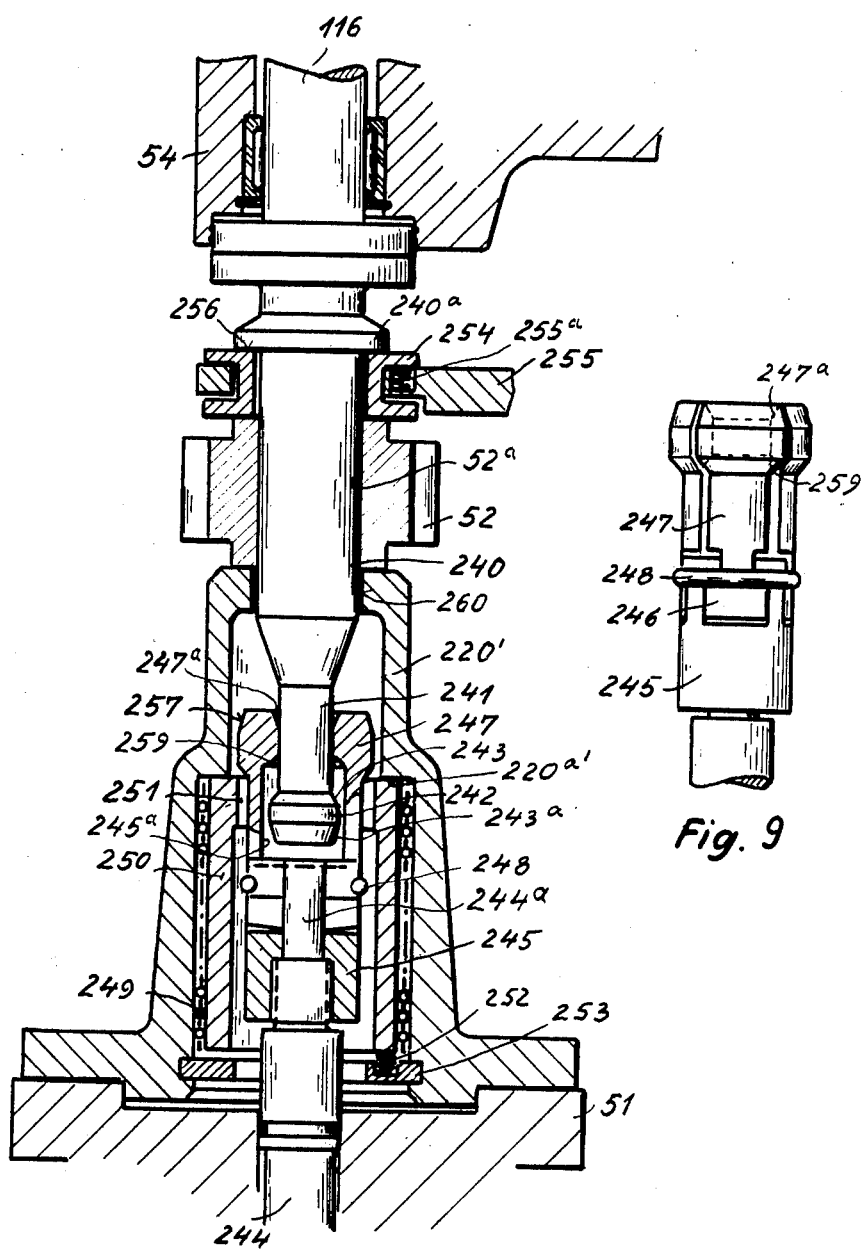
FIG. 8 is a similar vertical section showing a modified work holding and clamping device.
FIG. 9 is a fragmentary side elevational view of a composite collet which forms part of the device shown in FIG. 8.

The above described parts of the machine shown in FIGS. 1 to 3 are disclosed and claimed in my copending application Serial No. 155,042 for "Gear Shaping Machine" to which reference may be had, if necessary. These parts were described solely for the purpose of facilitating the understanding of the novel manner in which the element 54 may be moved along and clamped to its support 53 (FIGS. 4 to 6), and of the novel manner in which the workpiece 52 may be held and centered between the spindle nose 51 and the element 54 (FIGS. 7 to 9).

Figure 4:
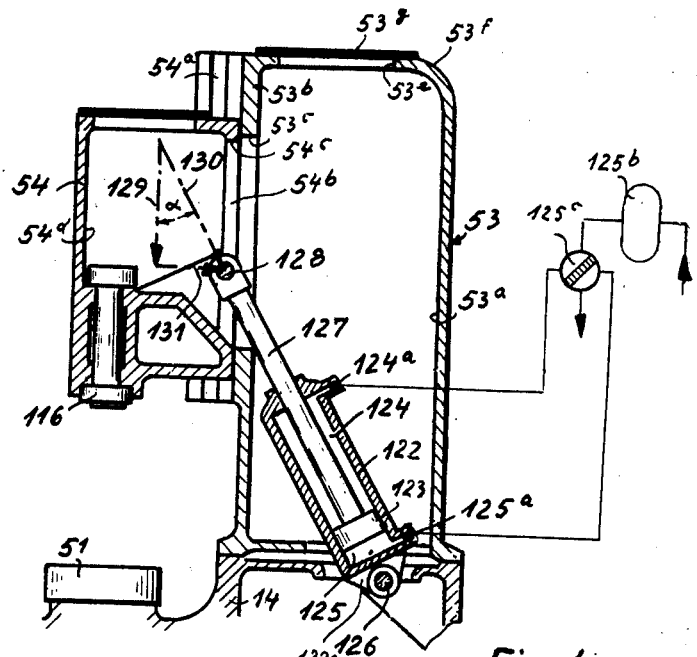
FIG. 4 is an enlarged vertical section as seen in the direction of arrows from the line IV—IV of FIG. 1, showing one form of the improved arrangement for reciprocating and clamping the work retaining element of the gear shaping machine.

Referring to FIG. 4, it will be seen that the support or column 53 is a hollow structure which defines an internal compartment 53a and whose front wall 53b is formed with a cutout or window 53c adjacent to a similar cutout or window 54c provided in the rear wall 54b of the work retaining element or headstock 54. This headstock is also hollow and defines an internal compartment 54d which communicates with the compartment 53a through the windows 53c, 54c.

The improved clamping and reciprocating arrangement for the headstock 54 is accommodated in the compartments 53a, 54d and comprises a double-acting fluid-operated (preferably hydraulic) cylinder 122 whose lower end is pivotally secured to the work slide 14 by a horizontal pivot pin 126 which is received in an apertured bracket 122a rigid with the cylinder. This cylinder receives a reciprocable piston 123 which divides its interior into an upper cylinder chamber 124 and into a lower cylinder chamber 125. The piston 123 is connected with a swingable elongated motive force transmitting rod 127 which is slidably guided in the upper end wall of the cylinder 122 and whose upper end is articulately secured to a horizontal pivot pin 128 mounted in the headstock 54. It will be noted that the piston rod 127 extends through the windows 53c, 54c. The cylinder chambers 124, 125 respectively communicate with conduits 124a, 125a which are connected with a pump 125b or another source of pressure fluid. Suitable control valve means 125c are provided to regulate the inflow and outflow of pressure fluid through the conduits 124a, 125a. Such valve means may be of any conventional design and may be regulated in a fully automatic way, for example, by the control system of the gear shaping machine or by the control system of the work centering device, and the exact construction thereof is well known to men skilled in the art.

The workpiece 52 (shown in FIGS. 1, 7 and 8) is held between the nose 51 of the work spindle 50 and a spindle sleeve 116 which is mounted in the headstock 54.

The axis of the reciprocating means including the cylinder 122, the piston 123 and the rod 127 is inclined with respect to the direction in which the headstock 54 is slidable in its ways 54a so that this axis encloses with the axis of the spindle sleeve 116 a downwardly opening acute angle alpha. Consequently, when the control system associated with the cylinder 122 admits pressure fluid to the upper chamber 124 and permits pressure fluid to escape from the lower chamber 125, the force 130 with which the swingable piston rod 127 tends to move the headstock 54 in downward direction has a vertical reciprocating component 129 which is parallel with the direction of downward movement of the headstock (i.e. with the longitudinal direction of the ways 54a) and which actually moves this headstock in the ways 54a, and a horizontal clamping component 131 which tends to move the headstock against the front wall 53b and thereby clamps the headstock against the column 53. The component 131 is substantially perpendicular to the longitudinal direction of the ways 54a.

If it is desired to move the headstock 54 in upward direction, i.e. to permit removal of the workpiece 52, fluid filling the chamber 124 is permitted to escape through the conduit 124a while the other conduit 125a admits pressure fluid to the lower chamber 125 so that the motive force transmitted by the piston rod 127 to the headstock 54 has an upwardly directed reciprocating component which actually moves the headstock in its ways 54a and a leftwardly directed unclamping component which tends to separate the headstock from the front wall 53b. When the headstock 54 slides in its ways 54a, the bracket 122a and the piston rod 127 respectively pivot or swing about the pins 126, 128.

The component 129 of the force 130 indicated in FIG. 4 prevents movement of the spindle sleeve 116 upwardly and away from the spindle nose 51 when the workpiece 52 is subjected to the action of the tool 30. It will be readily understood that the clamping component 131 of the force 129 increases proportionally with the force 129 which, of course, is highly desirable during a gear shaving operation. Since the pin 126 is secured to the work slide 14, the reciprocating means 122, 123, 127 actually presses the column 53 against the slide 14 when the upper chamber 124 receives pressure fluid. The unclamping action of the piston rod 127 is fully automatic as soon as the lower chamber 125 is connected with the source of pressure fluid.

The cylinder 122 is accessible through an aperture 53e provided in the upper end wall 53f of the column 53, and this aperture is normally sealed by a detachable cover plate or lid 53g.

Figure 5:
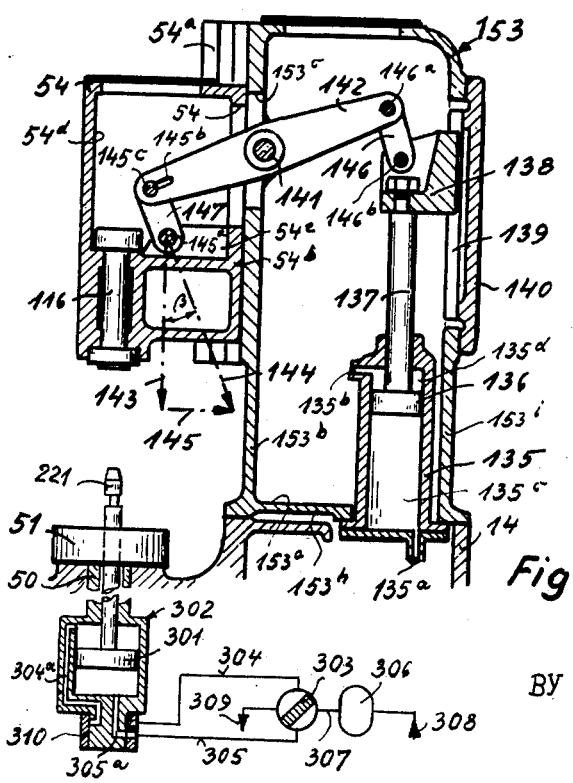
FIG. 5 is a similar vertical section showing a modified reciprocating and clamping arrangement.

FIG. 5 illustrates a modified reciprocating and clamping arrangement which is analogous to that shown in FIG. 4. The slightly modified hollow support or column 153 is provided with an internal compartment 153a which accommodates a fixed double-acting cylinder 135. The lower end of this cylinder is fixed to the bottom end wall 153h of the column 153 so that its conduit 135a extends into the interior of the hollow work slide 14, i.e. the cylinder is not secured to the work slide 14 but solely to the column 153. The cylinder 135 receives a reciprocable piston 136 which divides its interior into an upper cylinder chamber 135d and a lower cylinder chamber 135c. The chambers 135c, 135d respectively communicate with the conduits 135a, 135b which are connected to a suitable source of pressure fluid (preferably oil) through control valve means of the type mentioned in connection with FIG. 4. The piston 136 is connected with a piston rod 137 whose upper end is bolted to a pusher 138 which is slidably guided in vertical ways 139 provided on a detachable panel or door 140 secured to the apertured rear wall 153i of the column 153. The ways 139 and the cylinder 135 insure that the piston rod 137 reciprocates in vertical directions to rock a two-armed lever 142 through a link 146 which is respectively pivoted to the right-hand arm of the lever 142 (pin 146a) and to the pusher 138 (pin 146b). The lever 142 is rockable about a horizontal pin 141 which is fixed to the column 153, and the left-hand arm of this lever extends through aligned windows 153c, 54c, the former provided in the front wall 153b of the column 153 and the latter provided in the rear wall 54b of the work retaining headstock 54. The free end of the left-hand arm of the lever 142 is articulately connected to a swingable motive force transmitting link 147 by means of a pivot pin 145c, and a similar pivot pin 145a connects the lower end of the link 147 with a bracket 54e provided in the internal compartment 54d. The plane common to the axes of the horizontal pins 145c, 145a encloses with the longitudinal direction of the ways 54a a downwardly opening acute angle beta so that the motive force 144 transmitted by the link 147 to the headstock 54 (and acting in the common plane of the pins 145c, 145a) when the lower cylinder chamber 135c receives pressure fluid through the conduit 135a will have a downwardly directed reciprocating component 143 which actually moves the headstock in its ways 54a, and a rightwardly directed clamping component 145 which tends to clamp the headstock to the front wall 153b of the column 153.

The inclination of the force 144 may be changed so as to change the magnitude of the clamping component 145. In the embodiment of FIG. 5, the means for changing the magnitude of the clamping component 145 comprises an elongated slot 145b formed in the left-hand arm of the lever 142, and this slot permits adjustments in the position of the pivot pin 145c so that the inclination of the plane common to the pins 145c, 145a and hence the inclination of the force 144 may be changed. Of course means is provided for maintaining the pin 145c in its slot 145b in a plurality of selected positions each of which corresponds to a different clamping force.

Figure 4A:
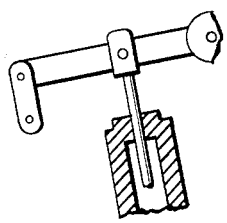
FIG. 4a is a fragmentary partly elevational and partly sectional view of a reciprocating arrangement which constitutes a slight modification of the arrangement shown in FIG. 4.

It is equally possible to fix the pin 146a to the column 153 and to connect the reciprocating means 122, 123, 127 of FIG. 4 with an intermediate portion of the lever 142, i.e. at a point between the pins 145, 146a. In such constructions, the pin 141, the block 138 and the link 146 may be dispensed with, and the lever 142 then acts as a one-armed lever which pivots about the pine 146a to transmit motion to the headstock 54 (see FIG. 4a).

Figure 6:
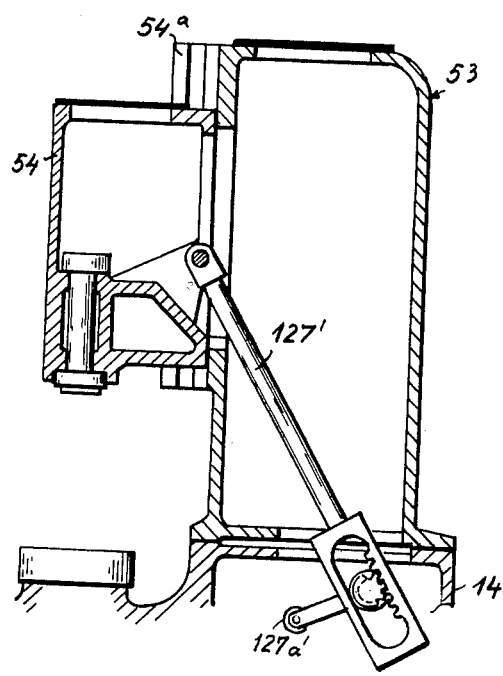
FIG. 6 is a fragmentary schematic view of a manually operable mechanical reciprocating and clamping arrangement.

FIG. 6 illustrates a slightly modified reciprocating and clamping means which is analogous to that of FIG. 4, excepting that the fluid-operated means 122, 123 127 is replaced by a mechanical reciprocating means including a threaded motive force transmitting spindle 127' and means including a manually turnable crank 127a' for shifting the spindle 127' and for thereby reciprocating the headstock 54 in its ways 54a. It will be readily understood that the crank 127a' may be replaced by a suitable reversible electric or hydraulic motor and that such motor may be started or arrested from the control panel in rhythm with other operations of the machine. It is equally possible to replace the fluid-operated reciprocating means 122, 123, 127 (FIG. 4) or 135, 136, 137 (FIG. 5) by a manually actuatable or motor-driven mechanical system, e.g. by a threaded spindle which is coupled to the pin 128 of FIG. 4 or to the pin 146b of FIG. 5.

As is well known in the art, the headstock 54 must have at least some play in its ways 54a in order to be rapidly shiftable toward and away from the spindle nose 51. This play is highly undesirable once the headstock is moved to its operative or work-clamping position, and the important advantage of the arrangements shown in FIGS. 4 to 6 is that they eliminate any, even slightest, play of the headstock 54 in a fully automatic way while at the same time serving as a means for reciprocating the headstock in the ways 54a.

Heretofore, the means for reciprocating and for clamping the headstock constituted two separate entities, i.e. the headstock was moved in its ways by a first mechanism and, when in operative position, was clamped to its support by a second mechanism, e.g. by clamping screws or by hydraulic clamping apparatus. As far as I am informed at this time, the present invention provides for the first time an arrangement which is capable of reciprocating and of simultaneously clamping or unclamping the headstock merely by mounting one or more components of the reciprocating means in such a way that the direction of their action encloses an acute angle with the longitudinal direction of the ways in which the work retaining headstock is supposed to move and by arranging the headstock in such a way that it moves in a direction to increase this angle when it should move toward and into direct or indirect retaining engagement with the workpiece The vertical component 129 (FIG. 4) or 143 (FIG. 5) of the force transmitted to the headstock 54 exerts a retaining force upon the workpiece, whereas the horizontal component 131 or 145 exerts a clamping force upon the headstock to hold it against the column 53 or 153.

In a machine tool in which the column 53 or 153 is mounted directly on or forms part of the slide 14, the reciprocating means 122, 123, 127 or 135, 136, 137 also serves as a means for holding the column against the slide whenever the headstock is moved in a direction to retain a workpiece. In such instances, the pin 128 of FIG. 4 or the lower part of the cylinder 135 shown in FIG. 5 is mounted directly in the machine frame. For example, FIG. 6 shows that the column 53 is mounted on the slide.

Referring to FIG. 7, there is shown a work holding and centering device including a substantially bell-shaped work support 220 which rests on and is secured to the spindle nose 51 (see FIG. 1). The workpiece 52 is assumed to be a spur gear which is to be shaped by the tool 30, and this workpiece rests on the top face of the support 220 so that its bore or aperture 52a is coaxially aligned with the bore 220a of the support 220. The bore 220a accommodates a work arbor 221 which latter is reciprocable in the axial direction thereof (arrow 221a) so that it may penetrate through the bore 52a. The means for reciprocating the arbor 221 may assume the form of a manually operable or a motor driven device or a hydraulic chuck motor which is schematically shown in FIG. 5. The hydraulic chuck motor comprises a piston 301 which is reciprocable in the direction of the arrow 221a (FIG. 7) in a hydraulic cylinder 302. The piston is controlled by valve means 303 which are connected with the hydraulic cylinder by conduits 304, 304a, 305, 305a and with a pump 306 by a conduit 307. The inflow of pressure fluid is shown with arrow 308 and the outflow is shown with arrow 309. A sleeve 310 connects the immovable conduits 304, 305 with the rotary cylinder 302 and conduits 304a, 305a. The upper end portion of the arbor 221 assumes the form of a plunger head or center 222 which is bounded by a cylindrical surface, by an upper conical surface 223 and by a lower conical surface 224.

The spindle sleeve 116 is rotatable in the headstock 54 and is coaxially aligned with the support 220. The mounting of the spindle sleeve 116 is such that it may take up axial stresses. The lower end portion of this spindle sleeve carries a collet 225 whose fingers or claws 225a are movable radially inwardly and outwardly with respect to the axis of the spindle sleeve 116. This collet defines an internal space 234 which is adapted to receive the center 222 and whose lower end is bounded by a conical surface 225b which is complementary to the lower conical surface 224 of the center.

The central bore of the spindle sleeve 116 receives a centering tube 226 which is axially reciprocable therein and whose lower end portion extends into the bore of the collet 225. It will be noted that the lower end of the centering tube 226 is provided with an internal conical surface 223a which is complementary to the upper conical surface 223 of the center 222. The means for biasing the tube 226 into the collet 225 so that its conical surface 223a abuts against the conical surface 223 assumes the form of a helical spring 227 disposed in a space formed between the upper end face of the tube 226 and a threaded plug 227a which is screwed into the internally threaded upper end portion of the spindle sleeve 116. The bias of the spring 227 may be changed by turning the plug 227a with respect to the spindle sleeve. The maximum stroke of the tube 226 is determined by an elongated bar or bolt 228 whose upper end portion is screwed into the plug 227a and whose lower end portion forms a slotted head 228a received in an enlarged portion of the coaxial bore in the tube 226 above the conical surface 223a. If the operator desires to change the stroke of the tube 226, he unscrews the plug 227a and withdraws the tube 226 with the bolt 228 from the bore of the spindle sleeve 116 so that he may gain access to the slotted head 228a. The spindle sleeve 116 is rotatable in thrust bearings 116a provided in the headstock 54.

An annular stripper or stop 239 is adjacent to the upper end face of the workpiece 52, and the outer diameter of this stripper is sufficiently small to permit proper engagement between the teeth 52b of the workpiece and the teeth of the tool 30 when the machine of which the arrangement shown in FIG. 7 forms part is in actual use. The diameter of the bore 239a in the stripper 239 is somewhat larger than the diameter of the bore 52a, i.e., the diameter of the bore 239a is also larger than the diameter of the center 222 so that the latter is free to pass therethrough. In fact, the diameter of the bore 239a is somewhat larger than the outer diameter of the lower end portion of the collet 225 formed by the claws 225a so that these claws may move slightly apart when received in the bore 239a. The stripper 239 is mounted on a horizontal arm 229 which is secured to the lower end of a bolt 230 and this bolt is vertically slidably received in a carrier or block 232 fixed to the column 153. As shown, the head 230a of the bolt 230 is biased in upward direction by a helical spring 231 which is received in an enlarged portion of the bore for the bolt 230 so that the spring 231 tends to lift the arm 229 and the stripper 239 above and away from the upper end face of the workpiece 52. The arm 229 is prevented from turning about the axis of the bolt 230 by a stud 233 which is reciprocable in a vertical bore of the block 232. The stud 233 constitutes an optional feature of my invention since it is also possible to utilize a swingable arm 229, if desired. The arrangement is such that the stripper 239 is free to perform axial movements in the range of a few millimeters with respect to the workpiece 52 when the collet 225 assumes a position at a level above that shown in FIG. 7, i.e. when the shoulders 235 of the claws 225a are spaced from the upper side of the stripper 239. This stripper is detachably secured to its arm 229 by a ring nut 229a or the like.

The device of FIG. 7 is operated as follows:

In the first step, i.e. when the headstock 54 is vertically spaced from the support 220, the operator or a suitable mechanism places the workpiece 52 onto the upper end face of the support 220. In the next step, the arbor 221 is caused to move upwardly through the bore 52a and into the collet 225 so that the center 222 moves the claws 225a apart and penetrates into the internal space 234 whereby the claws 225a are free to return radially inwardly and engage the lower conical surface 224 of the center 222. At the same time, the upper conical surface 223 moves into abutment with the conical surface 223a of the centering tube 226 so that this tube yields against the bias of the spring 227 and is axially displaced in the bore of the spindle sleeve 116.

In the next step, the two-armed lever 142 and the link 147 bring about a downward displacement of the headstock 54 in the ways 54a so that the arbor 221 and the collet 225 are also caused to move downwardly whereby portions of the claws 225 of the collet enter the bore 239a of the stripper 239 and penetrate into the bore 52a of the workpiece 52. The downward movement of the headstock 54 is arrested before the downwardly oriented shoulders 235 of the claws 225a engage the upper side of the stripper 239.

In the final step, the operator causes the arbor 221 to move downwardly with respect to the headstock 54 whereby the lower conical surface 224 of the center 222 spreads the claws 225a and causes these claws to engage the wall bounding the bore 52a in the workpiece 52 and to bring about a preliminary centering of the workpiece. As the arbor 221 continues its downward movement, it entrains the collet 225 and moves the shoulders 235 into abutment with the upper side of the stripper 239 so that the latter begins to participate in axial movement of the arbor 221 against the bias of the spring 231 and is moved into face-to-face abutment with the workpiece 52. The conical surface 224 of the center 222 now exerts a very strong spreading action upon and forces the claws 225a into abutment with the wall bounding the bore 52a so that any, even minimal, play between the workpiece 52 and the collet 225 is prevented and that the collet is held against any movements with respect to the support 220 or the spindle nose 51. The stripper 239 prevents further downward movement of the arbor 221 as soon as its underside comes into abutment with the upper side of the workpiece 52, and this stripper then transmits axial holding pressure to the workpiece.

When the gear shaping operation is completed, the operator causes the arbor 221 to move upwardly and thereupon lifts the headstock 54 so as to withdraw the claws 225a from the bores 52a and 239a and to thereupon withdraw the center 222 from the collet 225. The workpiece may be taken off the support 220 as soon as the arbor 221 is withdrawn into the support 220. The spring 231 automatically lifts the stripper 239 off the workpiece when the shoulders 235 are moved away from the stripper.

The support 220 may be removed so that the workpiece 52 may rest directly on the spindle nose 51.

Referring finally to FIGS. 8 and 9, there is shown a somewhat modified work holding and centering device in which a slightly different collet 245 is mounted on the arbor 244 and is adapted to cooperate with a mandrel 240, the latter having a tight sliding fit with the wall bounding the bore 52a of the workpiece 52. The internally threaded lower end portion of the collet 245 is screwed onto a shank 244a which forms an upwardly projecting extension of the arbor 244, and the upper end portion of the collet is formed with upwardly opening T-shaped slots 246 (see FIG. 9) each of which accommodates a detachable claw 247. These claws are pressed radially inwardly by an elastic ring 248. The upper end portion of the mandrel 240 is coaxially connected to the spindle sleeve 116 and its lower end portion 241 terminates in a cylindrical center or head 242 bounded by an upper conical surface 243 and by a lower conical surface 243a. The center 242 is extendable into the interior of a modified work support 220' which is fixed to the spindle nose 51 and which may accommodate the collet 245 so that the lower conical surface 243a spreads the claws 247 against the bias of the ring 248 by engaging the internal conical surfaces 247a of these claws before penetrating into the internal space 245a of the collet to assume the position of FIG. 8.

The support 220' receives a guide sleeve 250 which is mounted in an antifriction bearing 249 and which is formed with a bore 251 adapted to receive the claws 247. As shown in FIG. 8, the rolling elements or balls of the bearing 249 are received in a suitable cage which surrounds the sleeve 250. These rolling elements are received in the support 220' without any or with negligible play. Of course, it is equally possible to replace the bearing 249 by a tightly fitted cylindrical bushing or the like, as long as the sleeve is properly guided in its support 220' without any or with minimal lateral play and is permitted to perform limited axial movements in this support. The sleeve 250 is located above a retaining ring 253 which is mounted in the lower end portion of the support 220' and which is formed with suitable recesses for springs 252 which tend to move the sleeve 250 in upward direction so that the sleeve normally abuts against an internal shoulder 220a' of the support 220'.

The arrangement of FIGS. 8 and 9 also comprises an annular stripper or stop 254 which is mounted on an arm 255 and which is normally biased away from the upper end face of the workpiece 52 by one or more springs 255a which are mounted in the arm 255. As shown, the stripper 254 has limited freedom of axial movement with respect to the arm 255.

When the workpiece 52 is placed onto the support 220', the headstock 54 is caused to move in downward direction so that the center 242 of the mandrel 240 penetrates through the bore of the stripper 254, through the bore 52a of the workpiece 52, through the bore 260 at the upper end of the support 220' and that its lower conical surface 243a engages the upper conical surfaces 247a of the claws 247 whereby the claws are caused to move apart against the bias of the elastic ring 248 and the center 242 penetrates into the internal space 245a of the collet 245. As soon as the center 242 enters the space 245a, the ring 248 immediately moves the claws 247 radially inwardly and into abutment with the lower end portion or shank 241 of the mandrel 240. At the same time, the annular collar 240a of the mandrel 240 which defines a downwardly turned motion transmitting shoulder 256 moves into abutment with the upper side of the stripper 254 and displaces this stripper against the bias of the spring means 255a so that the stripper comes into abutment with the upper end face of the workpiece 52.

In the next step, the operator causes the arbor 244 to move in downward direction whereby the lower conical surfaces 259 of the claws 247 move into abutment with the upper conical surface 243 of the center 242 so that the claws 247 begin to move radially outwardly and to move their outer surfaces 257 into abutment with the wall bounding the bore 251 of the guide sleeve 250. During the initial stage of the radially outwardly directed movement of the claws 247 into abutment with the guide sleeve 250, the claws continue to perform an axial movement with respect to the mandrel 240. In order to reduce friction between the sleeve 250 and the claws 247, either the claws or the sleeve may be provided with suitable friction reducing means, not shown, such as spherical or otherwise shaped rolling elements or the like. The sleeve 250 follows the downward movement of the arbor 244 as soon as the outer surfaces 257 engage the wall of its bore 251 and is then displaced against the bias of the springs 252 to the extent determined by the position of the retaining ring 253. As soon as the claws 247 are properly retained in the bore 251, the mandrel 240 is held against any movement with respect to the support 220' and thereby centers the workpiece 52 in requisite position during the subsequent gear shaping operation.

The manner in which the workpiece may be released and removed from the device of FIGS. 8 and 9 is self-evident. All that is necessary to move the arbor 244 and the collet 245 in upward direction and to thereupon cause the headstock 54 to move upwardly and away from the workpiece so as to withdraw the mandrel 240 from the stripper 254.

It was found that the rolling elements of the bearing 249 are not subjected to excessive wear even if they are fitted very tightly between the sleeve 250 and the support 220', as long as their deformation does not exceed the elastic limit.

A very important advantage of the clamping devices shown in FIGS. 7 and 8 is that they prevent a tilting of the work retaining headstock 54 with respect to its column 53 or 153, and also that they prevent any tilting of the column 53 or 153 with respect to the work slide 14. FIG. 1 shows that the work slide 14, the column 53 and the headstock 54 form a substantially C-shaped unit which would be likely to "open-up" in response to substantial pressure transmitted by the headstock 54 to the work support 220, i.e. in which the headstock would be likely to become misaligned with its ways 54a or in which the column 53 would tend to assume an inclined position with respect to the work slide 14. The provision of a work holding and centering device in which a member (i.e. the arbor 221 of FIG. 7 or the collet 245 of FIG. 8) mounted in the work slide 14 proper cooperates with a complementary member (i.e. the collet 225 of FIG. 7 or the mandrel 240 of FIG. 8) which latter is mounted in the headstock 54 fully eliminates the possibility of any misinclination of the parts 14, 53 or 153 and 54 with respect to each other because the collet engages with the respective center and pulls the headstock in a direction toward the spindle nose 51. As a result of such mounting of the workpiece 52, the shaving tool 30 may remove comparatively thick shavings from its teeth 52b and the machine may be operated at a very high speed which is possible only if the operator is sure that the position of the workpiece and/or of the tool will not change during the actual shaving operation.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a machine tool, particularly in a gear shaping machine wherein a workpiece is held by clamping means while subjected to treatment by tool means, in combination, a supporting arrangement including a support having elongated ways; a mounting arrangement for mounting one of said means on said supporting arrangement; a headstock for holding the other of said means, said headstock being reciprocable in said ways toward and away from said one means; and a reciprocating arrangement for said headstock comrpising a motive force-transmitting member operatively connected with said headstock and movable in directions enclosing a pronounced acute angle with the longitudinal direction of said ways so that, when said headstock is moved toward said one means, the motive force transmitted thereto by said member includes a reciprocating force component which is parallel with the longitudinal direction of said ways and a pressure force component which is normal to the longitudinal direction of and is directed against said ways whereby the headstock is pressed against and remains in close contact with said ways along a fixed predetermined path to locate said other means in a predetermined position and against transversal movement relative to said one means.

2. A structure as set forth in claim 1, wherein said reciprocating arrangement further comprises a cylinder and piston unit for moving said motive force-transmitting member.

3. A structure as set forth in claim 1, wherein said reciprocating arrangement further comprises mechanical means for moving said motive force-transmitting member.

4. A structure as set forth in claim 1, wherein one end of said motive-force transmitting member is directly coupled to said headstock and wherein said reciprocating arrangement further comprises operating means for moving said member lengthwise, said operating means being swingably attached to said supporting arrangement.

5. A structure as set forth in claim 1, wherein said support is a hollow column and wherein at least a portion of said reciprocating arrangement is mounted in said column.

6. A structure as set forth in claim 1, wherein said reciprocating arrangement further comprises a lever pivotally mounted in said support and having an arm adjacent to said headstock, and means for pivoting said lever with respect to said support, said motive force-transmitting member comprising a link and a pair of pivot means respectively connecting said link to said headstock and to said arm of said lever.

7. A structure as set forth in claim 1, wherein said mounting arrangement mounts the clamping means and the tool means is mounted on said headstock.

8. A structure as set forth in claim 1, wherein said headstock is hollow and said motive force-transmitting member extends into said headstock.

References Cited by the Examiner

UNITED STATES PATENTS

| | | | |
|---|---|---|---|
| 1,313,277 | 8/19 | Elder | 269—50 |
| 1,371,374 | 3/21 | Ibach | 269—50 |
| 1,656,624 | 1/28 | Finsen | 90—1 |
| 2,190,067 | 2/40 | Hart | 90—96 |
| 2,333,344 | 11/43 | Smith et al. | 266—6 |
| 2,616,460 | 11/52 | Carlson | 144—136 |
| 2,995,068 | 8/61 | Mills | 90—1 |
| 3,021,764 | 2/62 | Durdin | 90—1 |

FOREIGN PATENTS

| | | |
|---|---|---|
| 1,035,450 | 7/58 | Germany. |
| 21,719 | 8/61 | Germany. |

WILLIAM W. DYER, Jr., *Primary Examiner.*

LEON PEAR, *Examiner.*